A. SGRITTA.
PULLEY.
APPLICATION FILED APR. 8, 1919.
1,353,074. Patented Sept. 14, 1920.
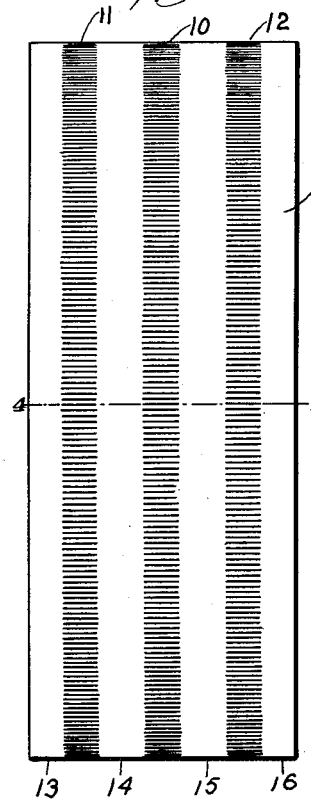
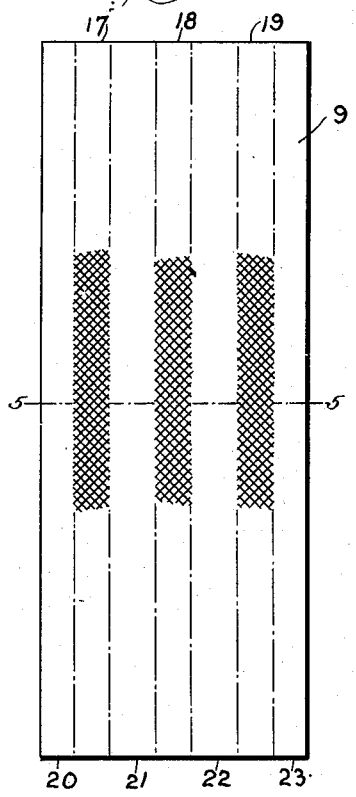
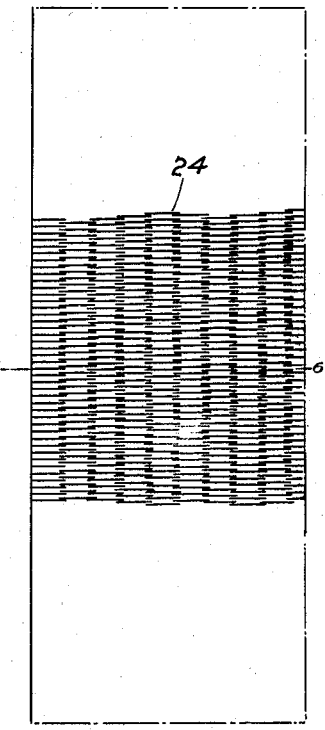
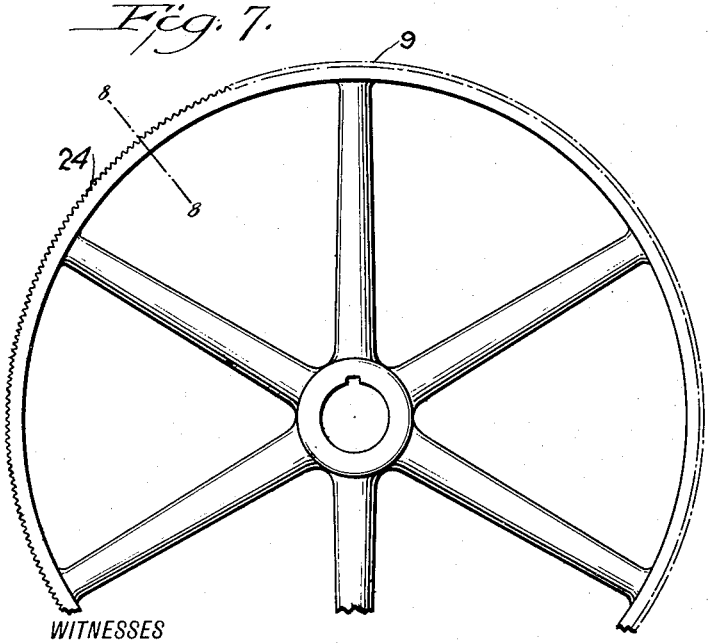
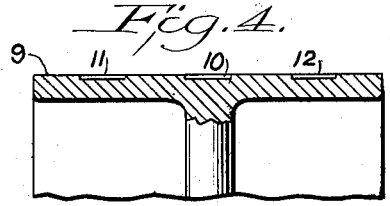
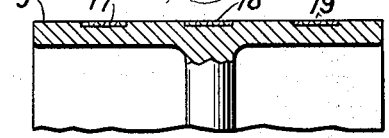
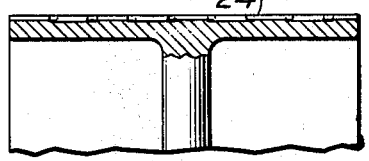
INVENTOR
ALFONSO SGRITTA
BY
ATTORNEYS
WITNESSES

UNITED STATES PATENT OFFICE.

ALFONSO SGRITTA, OF BROOKLYN, NEW YORK.

PULLEY.

1,353,074.  Specification of Letters Patent. Patented Sept. 14, 1920.

Application filed April 8, 1919. Serial No. 288,438.

*To all whom it may concern:*

Be it known that I, ALFONSO SGRITTA, a citizen of the United States, and a resident of the city of New York, borough of Brooklyn, county of Kings, State of New York, have invented certain new and useful Improvements in Pulleys, of which the following is a full, clear, and exact description.

My invention relates to belt-carrying pulleys for the transmission of power, and resides specifically in providing the rim of the pulley with a nurling to prevent the slipping of the belt and the lateral displacement and disengagement thereof.

It is the general practice to machine a finished smooth rim surface on pulleys to be used for the transmission of power by means of belting. In machine shops and in plants where lathes, milling machines, drill presses, power presses, automatic machinery and the like are installed and driven from main and counter shafts by means of belting traveling on smooth rim pulleys, difficulty is frequently experienced with slipping or skidding and lateral disengagement of the belting.

Slipping or skidding of the belt may be due to an overload when the belt has the proper amount of slack, but more often it is occasioned by drawing and lacing the belt too tightly, which materially reduced the arc of contact between the pulleys (driving and driven) and belt and thus cuts down the load capacity resulting in slipping and skidding of the belt even though the load be comparatively light. This condition results in added friction on the shaft and machine bearings, in consequence of which there is a waste of lubricating oil; and, where wooden pulleys are used, the friction between the belt and pulley rim surfaces not infrequently is the cause of fire.

Lateral working off or disengagement of the belt is commonly due to the belt being adjusted too loosely, as the result of which the smooth rim surfaces of the pulleys allow the lateral displacement of the belt and its eventual disengagement. This condition is not uncommonly the cause of serious accidents to operatives.

The object of my invention is to overcome the difficulties of belt slipping or skidding and disengagement under any conditions of belt tension and load, and to this end, my invention consists in nurling or roughing the outside rim surface of the pulley, which may be done with facility and at small cost. I find in practice that the most satisfactory results are accomplished by providing three circumferential, spaced strips or narrow bands of nurling or roughening, approximately one ten thoudsandth part of an inch in depth, extending laterally across the rim of the pulley, thus leaving a portion of the surface thereof smooth finished; and, I prefer to position one of the strips of nurling around the center of the rim with a strip spaced on both sides thereof, leaving smooth finished spaces between the center strip and the strips on either side, and also smooth finished space between the edges of the rim and the outside strips.

Proceeding to a more detailed description of my invention, reference is to be had to the accompanying drawings, illustrating the various applications of my invention, in which similar reference characters refer to corresponding parts throughout the several views, and in which, Figure 1 is a side view of a pulley, showing the rim thereof with three strips of nurling consisting of short serrations parallel to the axis of the pulley.

Fig. 2 is a side view of a pulley showing the rim thereof with three strips of nurling consisting of crossed or hatched serrations.

Fig. 3 is a side view of a pulley showing the rim thereof with nurling consisting of short serrations parallel to the axis of the pulley and extending solidly across the rim.

Fig. 4 is a sectional view of the rim of the pulley taken along the line 4—4, Fig. 1.

Fig. 5 is a sectional view of the rim of the pulley taken along the line 5—5, Fig. 2.

Fig. 6 is a sectional view of the rim of the pulley taken along the line 6—6, Fig. 3.

Fig. 7 is an end view of the pulley, indicating the depth of the nurling.

Fig. 8 is a sectional view of the rim of the pulley taken along the line 8—8, Fig. 7.

Referring to Fig. 1, the rim 9 of the pulley has impressed in the surface thereof a central strip of nurling 10, consisting of short serrations parallel to the axis of the pulley, and two similar strips of nurling 11 and 12, one on either side and spaced from the central strip 10, leaving smooth finished spaces 13, 14, 15 and 16 of the original rim surface of the pulley.

Referring to Fig. 2, the rim 9 of the pulley has impressed therein a central strip of nurling 18, consisting of short serrations crossed or hatched, and two similar strips of nurling 17 and 19, one on either side of and spaced from the central strip 18, leaving smooth spaces 20, 21, 22 and 23 of the original rim surface of the pulley.

The nurling may be extended solidly across the rim of the pulley, as illustrated in Fig. 3, by impressing in the surface thereof a series of overlapping strips 24.

The depth of the nurling, in all cases, as illustrated by strip 24 in Figs. 7 and 8, is preferably from one seven thousandth to one ten thousandth part of an inch.

The nurling may readily be impressed in the rim surface of pulleys by means of a nurling tool, the pulley being mounted on an arbor supported in a special machine used for finishing the rim surface. Thus any pulley, whether of metal or wood, having a smooth rim surface, may with facility and at small cost be altered so as to embody the invention herein described.

In operation, the nurled strips serve to guide the belt over the pulley, and the nurling presents a gripping surface which effectually resists any tendency toward lateral displacement or slipping or skidding of the belt, thus effecting a saving in power and economy of fuel, time and labor.

Having thus described my invention, I claim as new and desire to secure by Letters Patent,

1. A pulley of the class described, having the smooth finished rim surface thereof provided with a plurality of circumferential strips of nurling, spaced laterally one from the other, and extending across said rim surface, as and for the purposes set forth.

2. A pulley of the class described, having the smooth finished rim surface thereof impressed with a central circumferential strip of nurling, and a plurality of similar circumferential strips extending laterally on either side thereof and in spaced relation one with the other, as and for the purposes set forth.

3. A pulley of the class described, having the smooth finished rim surface thereof impressed with a central circumferential strip of nurling, and two similar circumferential strips, one on either side thereof and in spaced relation therewith, as and for the purposes set forth.

ALFONSO SGRITTA.